(12) United States Patent
Miyaji et al.

(10) Patent No.: US 7,609,645 B2
(45) Date of Patent: Oct. 27, 2009

(54) MOVING PICTURE COMPRESSION ENCODING TRANSCEIVER APPARATUS

(75) Inventors: Satoshi Miyaji, Saitama (JP); Yasuhiro Takishima, Saitama (JP); Yasuyuki Nakajima, Saitama (JP)

(73) Assignee: KDDI R&D Laboratories, Inc., Kamifukuoka-shi (JP)

( * ) Notice: Subject to any disclaimer, the term of this patent is extended or adjusted under 35 U.S.C. 154(b) by 954 days.

(21) Appl. No.: 10/802,794

(22) Filed: Mar. 18, 2004

(65) Prior Publication Data

US 2004/0190511 A1    Sep. 30, 2004

(30) Foreign Application Priority Data

Mar. 24, 2003   (JP) .............................. 2003-080134

(51) Int. Cl.
    *H04J 1/16*  (2006.01)
(52) U.S. Cl. ..................................... 370/252; 370/249
(58) Field of Classification Search ................ 370/229, 370/231, 232, 233, 234, 235, 389, 468
    See application file for complete search history.

(56) References Cited

U.S. PATENT DOCUMENTS

| | | | | |
|---|---|---|---|---|
| 6,044,082 A | * | 3/2000 | Nyg.ang.rd et al. | 370/437 |
| 6,069,872 A | * | 5/2000 | Bonomi et al. | 370/236 |
| 6,327,275 B1 | * | 12/2001 | Gardner et al. | 370/535 |
| 6,400,686 B1 | * | 6/2002 | Ghanwani et al. | 370/232 |
| 6,430,161 B2 | * | 8/2002 | Uemura et al. | 370/252 |
| 7,054,422 B2 | * | 5/2006 | Delaney et al. | 379/137 |
| 7,103,062 B1 | * | 9/2006 | Erickson et al. | 370/442 |
| 7,120,125 B2 | * | 10/2006 | Kikuchi et al. | 370/252 |
| 2002/0097723 A1 | * | 7/2002 | Tourunen et al. | 370/392 |
| 2003/0007509 A1 | * | 1/2003 | Tzannes et al. | 370/468 |
| 2003/0072376 A1 | * | 4/2003 | Krishnamachari et al. | 375/240.26 |
| 2005/0180415 A1 | * | 8/2005 | Cheung et al. | 370/389 |
| 2008/0089342 A1 | * | 4/2008 | Lansing et al. | 370/392 |

OTHER PUBLICATIONS

Schulzrinne H. et al., "*A Transport Protocol for Real-Time Applications*", IETF (Internet Engineering Task Force) RFC1889, Jan. 1996, pp. 1-3, 14-16, 23-28 and 71-75.

* cited by examiner

*Primary Examiner*—Ricky Ngo
*Assistant Examiner*—Kan Yuen
(74) *Attorney, Agent, or Firm*—Westerman, Hattori, Daniels & Adrian, LLP.

(57) ABSTRACT

It is made possible to concretely estimate actual transmission bit rate in a frame of grasping a line state by using a report packet.

Together with media packets encoded by a video encoder 1 and an audio encoder 2, a sender report packet generated by a sender report generation section 3 is sent to the transmission line. A receiver report packet is fed back from the receiver side. Each of the sender report packet and the receiver report packet includes report packets of two kinds differing in size. A rate estimation section 4 estimates transmission bit rate on the basis of round-trip delay time for the sender report packet and the receiver report packet each having a small size and round-trip delay time for the sender report packet and the receiver report packet each having a large size.

8 Claims, 5 Drawing Sheets

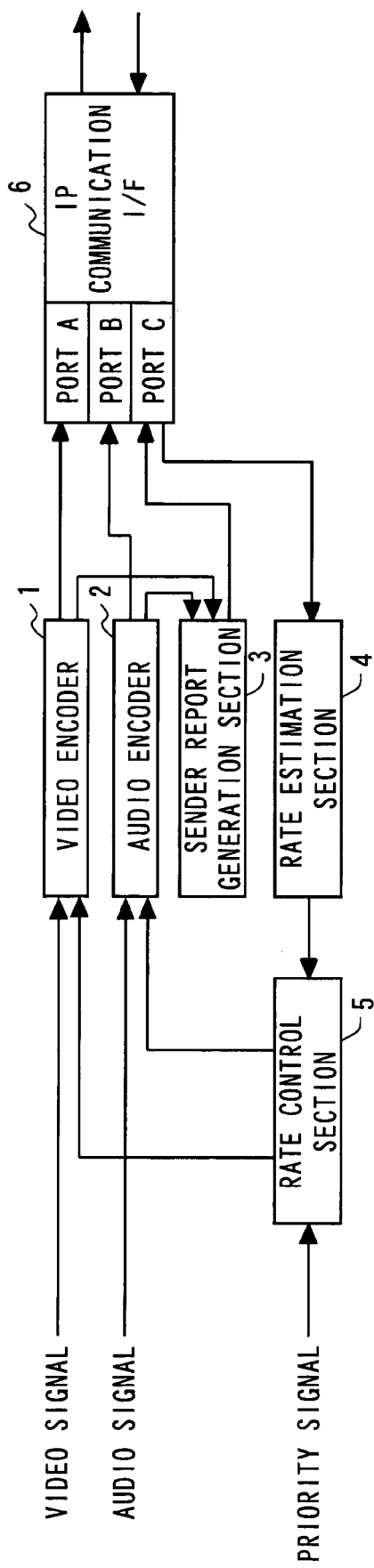

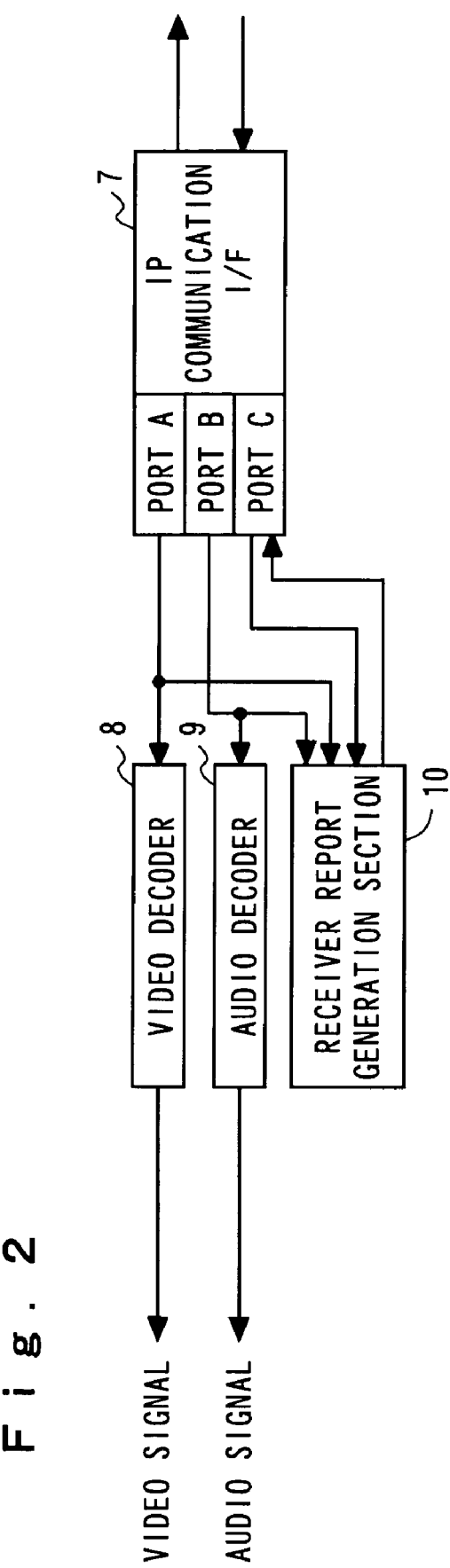

Fig. 3

| HEADER | PACKET LENGTH |
|---|---|
| SENDER TERMINAL ID ||
| TIME STAMP (INTEGER PART) ||
| TIME STAMP (DECIMAL PART) ||
| CONVERTED VALUE OF THE TIME STAMP IN MEDIA TIME SCALE ||
| NUMBER OF MEDIA PACKETS SENT HERETOFORE ||
| TOTAL NUMBER OF BYTES SENT HERETOFORE ||

Fig. 4

| HEADER | PACKET LENGTH |
|---|---|
| SENDER TERMINAL ID ||
| TIME STAMP (INTEGER PART) ||
| TIME STAMP (DECIMAL PART) ||
| CONVERTED VALUE OF THE TIME STAMP IN MEDIA TIME SCALE ||
| NUMBER OF MEDIA PACKETS SENT HERETOFORE ||
| TOTAL NUMBER OF BYTES SENT HERETOFORE ||
| DUMMY DATA ||

Fig. 5

| HEADER | PACKET LENGTH |
|---|---|
| RECEIVER TERMINAL ID || 
| ASSOCIATED SENDER TERMINAL ID ||
| SECTION MEDIA PACKET LOSS FACTOR | NUMBER OF ACCUMULATED MEDIA PACKET LOSSES |
| TOTAL NUMBER OF RECEIVED MEDIA PACKETS ||
| JITTER IN RECEIVED MEDIA PACKETS ||
| TIME STAMP IN A SENDER REPORT PACKET RECEIVED IMMEDIATELY BEFORE ||
| DELAY TIME BETWEEN RECEPTION OF A SENDER REPORT PACKET RECEIVED BEFORE AND SENDING OF A RECEIVER REPORT PACKET FOR THE SENDER REPORT PACKET ||

Fig. 6

| HEADER | PACKET LENGTH |
|---|---|
| RECEIVER TERMINAL ID ||
| ASSOCIATED SENDER TERMINAL ID ||
| SECTION MEDIA PACKET LOSS FACTOR | NUMBER OF ACCUMULATED MEDIA PACKET LOSSES |
| TOTAL NUMBER OF RECEIVED MEDIA PACKETS ||
| JITTER IN RECEIVED MEDIA PACKETS ||
| TIME STAMP IN A SENDER REPORT PACKET RECEIVED IMMEDIATELY BEFORE ||
| DELAY TIME BETWEEN RECEPTION OF A SENDER REPORT PACKET RECEIVED BEFORE AND SENDING OF A RECEIVER REPORT PACKET FOR THE SENDER REPORT PACKET ||
| DUMMY DATA ||

MOVING PICTURE COMPRESSION ENCODING TRANSCEIVER APPARATUS

BACKGROUND OF THE INVENTION

1. Field of the Invention

The present invention relates to a moving picture compression encoding transceiver apparatus, and in particular to such a moving picture compression encoding transceiver apparatus that transmission bit rate can be concretely estimated even in the case where transmission bit rate is altered step by step.

2. Description of the Related Art

In real time communication for converting a real time video signal and a real time audio signal into digital data and transmitting the digital data, control must be exercised so as to keep the encoding rate in an information source within transmission bit rate.

For example, on radio transmission lines for the like of portable telephones and transmission lines of best effort type such as IP networks, it is considered that transmission bit rate varies every moment according to the congestion situation on the network. If a state in which transmission bit rate is less than the encoding rate in the information source due to this variation continues for a certain fixed time, an increase in delay or an interruption in received video/audio signal occurs and a degradation in communication quality is caused.

In order to prevent the communication quality from falling, it becomes necessary to monitor transmission bit rate, successively reflect the monitored result in control of the encoding bit rate in the information source, and always satisfy conditions required of the real time communication described above.

In the RTCP (Real-time Transport Control Protocol) prescribed in the IETF (Internet Engineering Task Force) RFC 1889, which is now adopted as a substantial international standard scheme, a report packet aiming at monitoring the transmission line is used, and the SR (Sender Report) and the RR (Receiver Report) are defined.

The sender report has an object of providing information serving as a reference in creating a receiver report in a receiver side apparatus. The sender report includes a time stamp, the number of sent media packets (video/audio packets), and the number of sent data bytes. A sender side apparatus periodically transmits sender reports besides actual media packets.

The receiver side apparatus takes out reference time from a sender report transmitted from the sender side apparatus, creates a receiver report on the basis of the reference time, and sends back the receiver report to the sender side apparatus. The receiver report includes a section packet loss factor, the number of accumulated packet losses, a sequence number of a media packet received immediately before, jitter in media packet arrival interval, a time stamp of a sender report received immediately before, and a delay time between reception of an immediately preceding sender report and sending of a receiver report.

In this way, in the conventional media (video/audio) transceiver apparatus adopting the RTCP, sender reports and receiver reports are used, and the sender side apparatus conducts control so as to optimize the receiving quality in the receiver side apparatus by controlling the encoding bit rate of data to be sent and so on, on the basis of a receiver report fed back from the receiver side apparatus.

Information concerning the transmission line that can be estimated in the sender side apparatus by using the RTCP is packet loss caused over a long period of time, packet loss caused over a short period of time, and jitter on the line. This is premised on that in typical wired IP networks (Internet lines) a data bit rate momentarily exceeding the transmission bit rate is acceptable as characteristics of the line at ordinary times, and packet loss and jitter sometimes occur at the time of congestion on the line.

In radio IP networks for portable telephones, however, only estimation of the packet loss and jitter is not sufficient in some cases for a reason described hereafter. For example, in the case of data communication using the third generation portable telephone cdma 2000 1xEV-DO in the sender side apparatus, transmission bit rate (rate mode) in the sending direction of portable telephone is altered among, for example, 9.6 kbps, 19.2 kbps, 38.4 kbps, 76.8 kbps and 153.6 kbps step by step while considering the radio wave state on the terminal side and the congestion state in the base station.

If an encoding bit rate now under transmission exceeds transmission bit rate as a result of alteration of transmission bit rate, the packet loss and jitter increase relatively. Therefore, the sender side apparatus can determine that the encoding bit rate now under transmission needs to be altered, on the basis of the receiver report using the RTCP.

Unlike the Internet line premised on the fixed bit rate even though there is a fluctuation, however, only detection of a change in communication rate is not sufficient in such a network in which stepwise alteration of transmission bit rate is conducted as described above. For example, even if it is known from increase in packet loss or jitter that alteration of the encoding bit rate now under transmission is necessary, which value the bit rate should be altered to is not known. In the case where transmission bit rate has been altered, it is necessary to be capable of rapidly estimating transmission bit rate now in use and finding an encoding bit rate under transmission to be used concretely.

SUMMARY OF THE INVENTION

An object of the present invention is to provide a moving picture compression encoding transceiver apparatus capable of concretely estimating actual transmission bit rate in a frame of grasping a line state by using a report packet.

In order to accomplish the object, a first feature of this invention is that a moving picture compression encoding transceiver apparatus for sending media packet from a sender side apparatus to a receiver side apparatus, and sending and receiving a sender report packet and a receiver report packet between the sender side apparatus and the receiver side apparatus, wherein each of the sender report packet and the receiver report packet comprises report packets of two kinds differing in size, and the sender side apparatus comprises a transmission bit rate estimation means for estimating transmission bit rate on the basis of round-trip delay time for a sender report packet and a receiver report packet each having a small size and round-trip delay time for a sender report packet and a receiver report packet each having a large size.

A second feature of this invention is that the moving picture compression encoding transceiver apparatus according to claim 1, wherein the transmission bit rate estimation means estimates transmission bit rate by using dual linear simultaneous equations composed of an equation for finding round-trip delay time for the sender report packet and the receiver report packet each having the small size and an equation for finding round-trip delay time for the sender report packet and the receiver report packet each having the large size.

A third feature of this invention is that the moving picture compression encoding transceiver apparatus according to claim 1, wherein the sender report packet and the receiver report packet each having the large size are obtained by adding dummy data to the sender report packet and the receiver report packet each having the small size, respectively.

A fourth feature of this invention is that the moving picture compression encoding transceiver apparatus according to claim 3, wherein the sender side apparatus sends a set of packets combined in the order of a sender report packet having a small size, a sender report packet having a large size, and media packets.

A fifth feature of this invention is that the moving picture compression encoding transceiver apparatus according to claim 4, wherein, after sending and receiving of a set of packets have been finished, the next set of packets is sent.

A sixth feature of this invention is that the moving picture compression encoding transceiver apparatus according to claim 3, wherein the dummy data has been subjected to compression processing.

A seventh feature of this invention is that the moving picture compression encoding transceiver apparatus according to claim 1, wherein transmission bit rate estimated by the transmission bit rate estimation means is reflected into encoding for media.

A eighth feature of this invention is that the moving picture compression encoding transceiver apparatus according to claim 7, wherein, when reflecting transmission bit rate on a network estimated by the transmission bit rate estimation means into encoding for media, rate control is conducted according to priority of subject media.

According to a feature of the present invention, it is possible to concretely estimate an actual transmission bit rate in a frame of grasping a line state by using a report packet, by using report packets of two kinds differing in size.

Furthermore, by sending and receiving packets in the order of a report packet having a small size, a report packet having a large size, and media packets, the time of stay of a packet in a sending buffer can be shortened and transmission bit rate can be estimated with a reduced error.

In addition, a set of packets combined in the order of a sender report packet having a small size, a sender report packet having a large size, and media packets is used as a unit. After sending and receiving of one unit has been finished, packets of the next one unit are sent. As a result, the next packet is prevented from staying in the sending buffer due to a residual media packet in the sending buffer.

BRIEF DESCRIPTION OF THE DRAWINGS

FIG. 1 is a block configuration diagram showing an embodiment of a moving picture compression encoding sender apparatus according to the present invention;

FIG. 2 is a block configuration diagram showing an embodiment of a moving picture compression encoding receiver apparatus according to the present invention;

FIG. 3 is a diagram of an example of a sender small report packet;

FIG. 4 is a diagram of an example of a sender large report packet;

FIG. 5 is a diagram of an example of a receiver small report packet;

FIG. 6 is a diagram of an example of a receiver large report packet;

DETAILED DESCRIPTION OF THE PREFERRED EMBODIMENT

Figure 7:
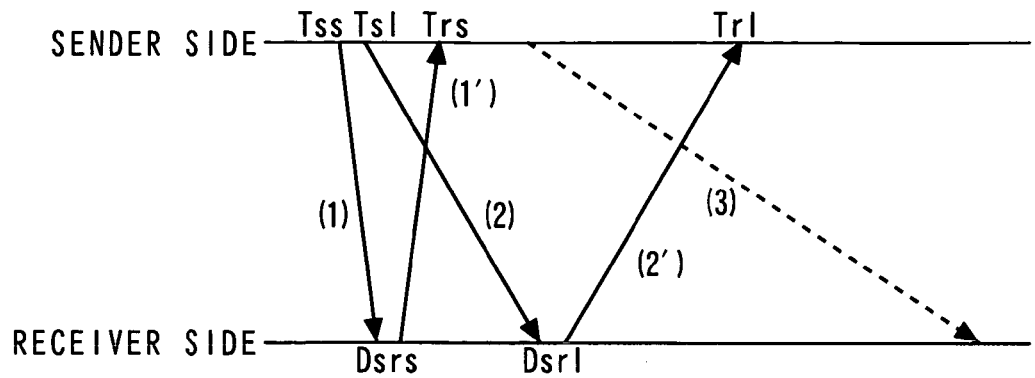
FIG. 7 is a diagram of a preferred sending order of packets.

Hereafter, the present invention will be described in detail with reference to the drawings. FIG. 1 is a block configuration diagram showing an embodiment of a sender side apparatus in a moving picture compression encoding sender apparatus according to the present invention. The present apparatus may serve as a receiver side apparatus as well. In FIG. 1, however, only a configuration part concerning the sending is shown as a sending side apparatus. With reference to FIG. 1, a video signal obtained from a video device such as a camera is subjected to compression encoding in a video encoder 1. Compressed data (bit stream) generated by the video encoder 1 is packetized by using, for example, the RTP form prescribed in IETF RFC 1889. By the way, in the present invention, the packetizing form may be of any type.

At the same time, an audio signal from a microphone is subjected to compression encoding in an audio encoder 2. Compressed data (bit stream) generated by the audio encoder 2 is packetized at fixed intervals in the same way. Hereafter, video and audio packets are referred to as media packets.

On the basis of the sending terminal ID (random unique value), current time, the number of media packets sent heretofore, and the total number of bytes sent heretofore, a sender report generation section 3 generates a sender report packet. In the present invention, there are sender report packets of two kinds. One of the sender report packets is a small report packet. As exemplified in FIG. 3, the small report packet includes a header, a packet length, a sender terminal ID, a time stamp (integer part), a time stamp (decimal part), a converted value of the time stamp in a media time scale, the number of media packets sent heretofore, and the total number of bytes sent heretofore. There is, for example, a four-byte size in a horizontal direction in FIG. 3.

The other of the sender report packets is a large report packet. As exemplified in FIG. 4, the large report packet is obtained by adding dummy data of a predetermined size to the small report packet.

Here, the dummy data is meaningless data, and arbitrary binary data can be added. If data of a simple pattern, such as data of all 0, is added as the dummy data in the case where the data compression protocol is adopted on the transmission line, there is a possibility that the effective size of the large report packet will remarkably deviate from the actual size because of compression on the transmission line.

Considering the case where the data compression protocol is adopted on the transmission line, it is desirable that the dummy data in the large report packet is data that is hardly subjected to re-compression on the transmission line, such as data subjected to PC-oriented compression such as LZH or ZIP, or data subjected to image compression such as JPEG or MPEG.

On the basis of information in a receiver report packet sent from a receiver side apparatus which is the opposite party of communication and information (sending time for a sender report packet, receiving time for a receiver report packet, and sizes of these report packets) that can be known in a sender side apparatus, a rate estimation section 4 estimates transmission bit rate, and gives the estimated transmission bit rate to a rate control section 5. The receiver report sent from the receiver side apparatus and the rate estimation section 4 will be described later.

According to preset priority, i.e., according to weighting as to which of the video signal or the audio signal should be subject to the rate control when there is an alteration in transmission bit rate, the rate control section 5 outputs a desired encoding bit rate signal to the video encoder 1 and the audio encoder 2. According to the desired encoding bit rate signal, the video encoder 1 and the audio encoder 2 set a desired encoding bit rate.

By thus using the priority, it is possible to make the subject of the rate control only the video signal, only the audio signal, or the video signal and the audio signal half-and-half. Furthermore, it is also possible to cause the subject of the rate control to be the video signal and the audio signal at an arbitrary ratio.

In the sender side apparatus, the media packets and the sender report packet are sent to the network via an IP communication interface 6. Typically, a TCP or a UDP is used as an upper layer for the IP. As shown in FIG. 1, multiplexing is conducted by assigning different port numbers (ports A, B and C) to respective packets. A receiver report packet is received by using the same port (the port C in the example shown in FIG. 1) as the sender report packet.

FIG. 2 is a block configuration diagram showing an embodiment of a receiver side apparatus in a moving picture compression encoding transceiver apparatus according to the present invention. The present apparatus can also serve as the sender side apparatus. In FIG. 2, however, only a configuration concerning the reception is shown as a receiver side apparatus. The media packets and the sender report packet supplied from the network are separated into ports for the TCP or UDP (ports A, B and C) and received via an IP communication interface 7. Video media packets are decoded by a video decoder 8 and reproduced as a video signal. Audio media packets are decoded by an audio decoder 9 in the same way and reproduced as an audio signal.

A receiver report generation section 10 generates a receiver report packet on the basis of a receiver terminal ID (random unique value), a sender terminal ID obtained from the sender report packet, a section media packet loss factor, the number of accumulated media packet losses, the total number of received media packets, jitter in media packet arrival interval, a time stamp in a sender report packet received immediately before, and a delay time between reception of the sender report packet received immediately before and sending of a receiver report packet for the sender report packet received immediately before.

In the receiver report packets as well, there are two kinds so as to correspond to the large sender report packet and the small sender report packet. One of the receiver report packets is a small report packet. As exemplified in FIG. 5, the small report packet includes a header, a packet length, a receiver terminal ID, an associated sender terminal ID, a section media packet loss factor, the number of accumulated media packet losses, the total number of received media packets, jitter in received media packets, a time stamp in a sender report packet received immediately before, and a delay time between reception of a sender report packet received immediately before and sending of a receiver report packet for the sender report packet. There is, for example, a four-byte size in a horizontal direction in FIG. 5 in the same way as the sender report packet.

The other of the sender report packets is a large report packet. As exemplified in FIG. 6, the large report packet is obtained by adding dummy data similar to the dummy data added in the sender large report packet, to the small report packet.

By the way, a receiver report packet is generated so as to coincide with whether the sender report packet is large or small. In other words, a receiver small report packet is generated for a sender small report packet, and a receiver large report packet is generated for a sender large report packet.

The receiver report packet generated by the receiver report generation section 10 is sent from the same port (the port C in the example shown in FIG. 2) as that used for receiving the receiver report packet and is fed back to the sender side apparatus.

The rate estimation section 4 shown in FIG. 1 will now be described. The rate estimation section 4 estimates transmission bit rate on the basis of information in the receiver report packet sent from the receiver side apparatus and information that can be known in the sender side apparatus.

Denoting the bit rate in the sending direction viewed from the sender side apparatus by Rs, the bit rate in the receiving direction by Rr, the size of the sender small report packet by Sss, the size of the sender large report packet by Ssl, the size of the receiver small report packet by Srs, the size of the receiver large report packet by Srl, the delay time between reception of the sender small report packet and sending of the receiver small report packet in the receiver side apparatus by Dsrs, the delay time between reception of the sender large report packet and sending of the receiver large report packet in the receiver side apparatus by Dsrl, time when the sender small report packet is sent in the sender side apparatus by Tss, time when the sender large report packet is sent in the sender side apparatus by Tsl, time when the corresponding receiver small report packet is received in the sender side apparatus by Trs, time when the corresponding receiver large report packet is received in the sender side apparatus by Trl, the round-trip delay time of the small report packet (the sender small report packet and the receiver small report packet) by Ds, and the round-trip delay time of the large report packet (the sender large report packet and the receiver large report packet) by Dl, dual linear simultaneous equations composed of the following equations (1) and (2) are satisfied. However, Sss/Ssl≠Srs/Srl and this relationship is typically satisfied if the small report packets conform to the RTCP.

$$Ds = Sss/Rs + Srs/Rr + Dsrs \quad (1)$$

$$Dl = Ssl/Rs + Srl/Rr + Dsrl \quad (2)$$

Where $$Ds = Trs - Dsrs - Tss$$

$$Dl = Trl - Dsrl - Tsl,$$

and Sss, Ssl, Srs and Srl are fixed values. Tss, Tsl, Dsrs and Dsrl are contained in the receiver report packet, and Trs and Trl are values that can be known in the sender side apparatus. By solving the dual linear simultaneous equations with these values, therefore, the bit rate Rs in the sending direction and the bit rate Rr in the receiving direction, i.e., transmission bit rate can be calculated uniquely.

Next, the sending order of packets will now be described. It is desirable that the packets are sent from the sender side apparatus in the order of the sender small report packet (1), the sender large report packet (2), and the media packets (3) as shown in FIG. 7. With reference to FIG. 7, the sender side apparatus sends the sender small report packet (1) at time Tss, and sends the sender large report packet (2) at time Tsl. The receiver side apparatus sends the receiver small report packet (1') with the delay time Dsrs after the reception time of the sender small report packet (1), and sends the receiver large report packet (2') with the delay time Dsrl after the reception time of the sender large report packet (2). Upon receiving the receiver small report packet (1'), the sender side apparatus sends the media packets (3).

Figure 8:
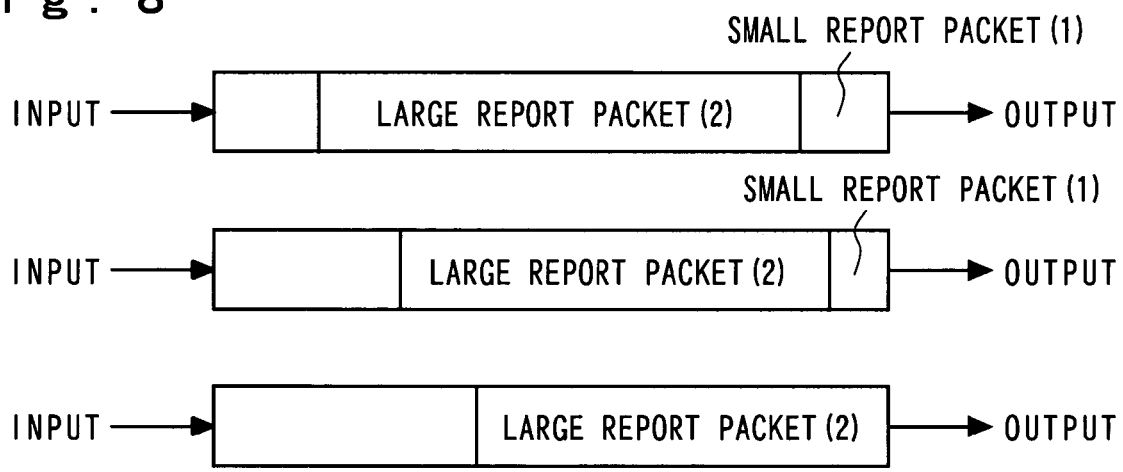
FIG. 8 is a diagram showing stay of packets in a sending buffer.

In FIG. 7, the time between supply of each packet to a sending buffer and actual sending thereof conducted via the sending buffer is neglected. As a matter of fact, however, the sender large report packet (2) stays in the sending buffer since immediately after it is input to the sending buffer until the sending of the sender small report packet (1) has been finished, as shown in FIG. 8 step by step. The time during which the sender large report packet (2) stays in the sending buffer becomes an error in calculating the round-trip delay time of the packet.

If the size of the sender small report packet (1) is sufficiently smaller than the size of the sender large report packet (2), however, the time required for the sender small report packet (1) to arrive at the receiver side apparatus is sufficiently smaller than the time required for the sender large report packet (2) to arrive at the receiver side apparatus. By first sending the sender small report packet (1) in packet sending, therefore, the time over which the sender large report packet (2) stays in the sending buffer can be made sufficiently short and the error in calculating the round-trip delay time of the packet can be made sufficiently small.

At a point in time in which the receiver large report packet (2') is sent in the receiver side apparatus in response to the sender large report packet (2), sending of the receiver small report packet (1') conducted in response to the sender small report packet (1) is finished. Therefore, stay of the receiver large report packet (2') due to existence of the receiver small report packet (1') is not caused.

It is desirable to finish sending and receiving of one set of packets, i.e., one unit composed of the sender small report packet (1), the sender large report packet (2) and the media packets (3) and then send the next unit of packets. If the media packet remains in the sender buffer, sending of the packets of the next set is waited. That is the reason.

Figure 9:
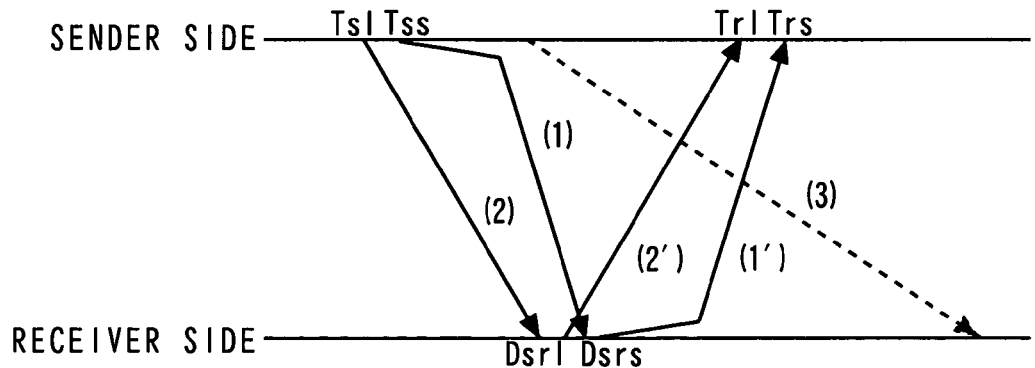
FIG. 9 is a diagram of a sending order of packets.

For reference, an example in which packets are sent in the order of the sender large report packet (2), the sender small report packet (1) and the media packets (3) is shown in FIG. 9. In this example, the sender small report packet (1) stays in the sending buffer in the sender side apparatus over a long time since it is supplied to the sending buffer until sending of the sender large report packet (2) is finished. In the receiver side apparatus as well, at a point in time in which the receiver small packet (1') is to be sent in response to the sender small packet (1), sending of the receiver large packet (2') in response to the sender large packet (2) is not finished. Until the sending is finished, therefore, the receiver small packet (1') stays in the sending buffer. By the way, the sender small packet (1) and the receiver small packet (1') stay in the sending buffer in the sender side apparatus and in the sending buffer in the receiver side apparatus, respectively. In FIG. 9, however, the sender small packet (1) and the receiver small packet (1') are shown to be separated slightly from the sender side and receiver side for the purpose of clarity.

Heretofore, the embodiment has been described. However, the moving picture compression encoding transceiver apparatus according to the present invention can be applied widely to portable Video telephony, Internet Video telephony and other real time moving picture communications.

According to the present invention, it is possible in the moving picture compression encoding transceiver apparatus to concretely estimate transmission bit rate and reflect the estimated transmission bit rate into the encoding control, as evident from the foregoing description. As a result, information source encoding suited to transmission bit rate can be conducted. Even on a transmission line on which transmission bit rate dynamically varies among a plurality of rate modes, therefore, real time moving picture communication having a communication quality kept good becomes possible.

What is claimed is:

1. A moving picture compression encoding transceiver apparatus for sending media packet from a sender side apparatus to a receiver side apparatus, and sending and receiving a sender report packet and a receiver report packet between the sender side apparatus and the receiver side apparatus, wherein each of the sender report packet and the receiver report packet comprises report packets of two kinds differing in size, and the sender side apparatus comprises a transmission bit rate estimation means for estimating a transmission bit rate which is being altered step by step, said estimation means estimating the instantaneous transmission bit rate on the basis of round-trip delay time for a sender report packet and a receiver report packet each having a small size and round-trip delay time for a sender report packet and a receiver report packet each having a large size, wherein sizes of said report packets of two kinds are fixed values, and a time when the report packets are sent in the sender side apparatus and a delay time between receiving and sending the report packets in the receiver side apparatus are provided in the receiver report packet and a time when the report packets are received in the sender side apparatus is known in the sender side apparatus.

2. The moving picture compression encoding transceiver apparatus according to claim 1, wherein the transmission bit rate estimation means estimates transmission bit rate by using dual linear simultaneous equations composed of an equation for finding round-trip delay time for the sender report packet and the receiver report packet each having the small size and an equation for finding round-trip delay time for the sender report packet and the receiver report packet each having the large size.

3. The moving picture compression encoding transceiver apparatus according to claim 1, wherein the sender report packet and the receiver report packet each having the large size are obtained by adding dummy data to the sender report packet and the receiver report packet each having the small size, respectively.

4. The moving picture compression encoding transceiver apparatus according to claim 3, wherein the sender side apparatus sends a set of packets combined in the order of a sender report packet having a small size, a receiver report packet having a large size, and media packets.

5. The moving picture compression encoding transceiver apparatus according to claim 4, wherein, after sending and receiving of a set of packets have been finished, the next set of packets is sent.

6. The moving picture compression encoding transceiver apparatus according to claim 3, wherein the dummy data has been subjected to compression processing.

7. The moving picture compression encoding transceiver apparatus according to claim 1, wherein transmission bit rate estimated by the transmission bit rate estimation means is reflected into encoding for media.

8. The moving picture compression encoding transceiver apparatus according to claim 7, wherein, when reflecting the transmission rate on a network estimated by the transmission bit rate estimation means into encoding for media, rate control is conducted according to priority of subject media.

* * * * *